Dec. 31, 1963 F. MIRANDO 3,115,977
METHOD OF SHIPPING WATERMELONS
Filed May 23, 1961 2 Sheets-Sheet 1
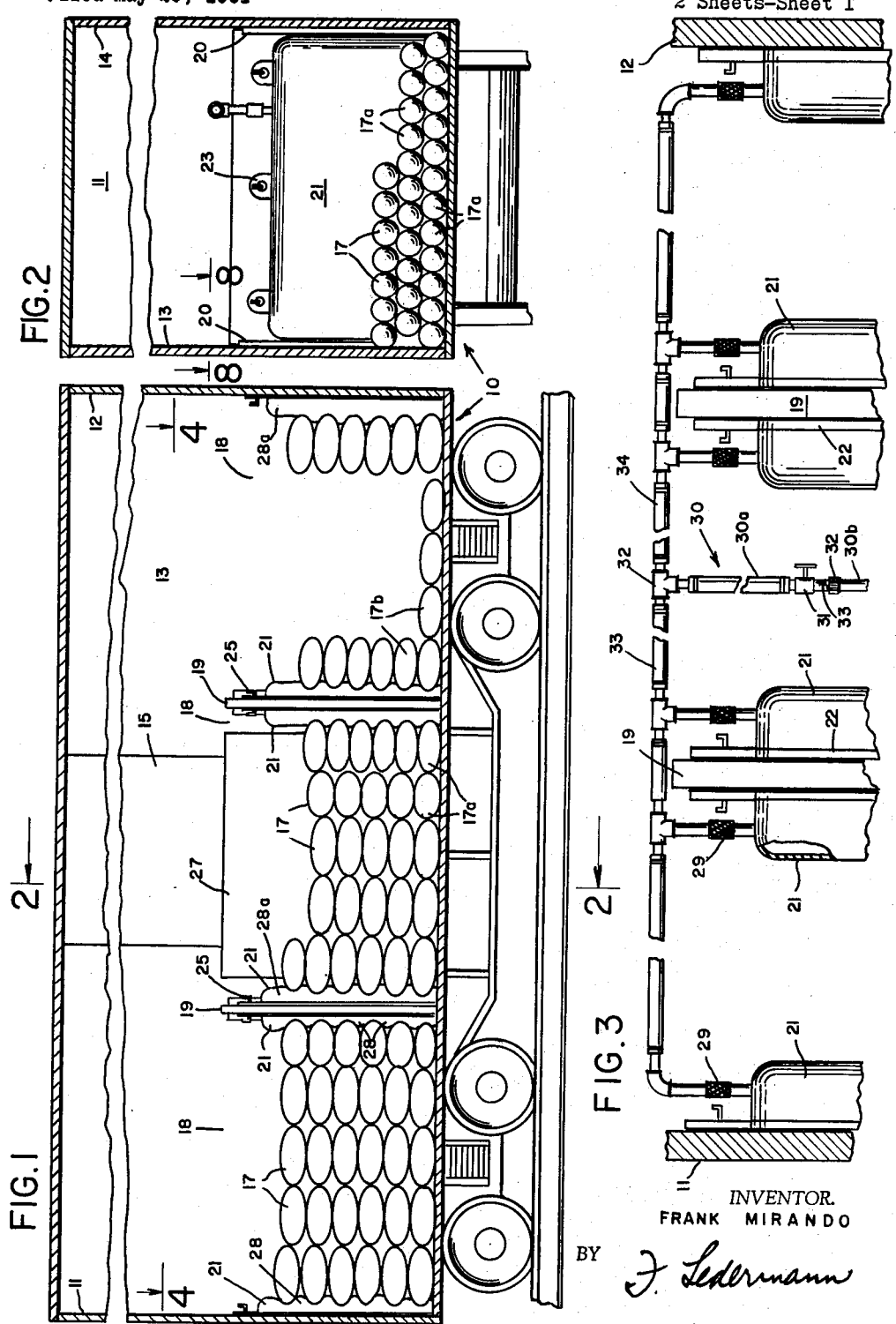
INVENTOR.
FRANK MIRANDO
BY *F. Ledermann*
ATTORNEY Dec. 31, 1963   F. MIRANDO   3,115,977
METHOD OF SHIPPING WATERMELONS
Filed May 23, 1961   2 Sheets-Sheet 2
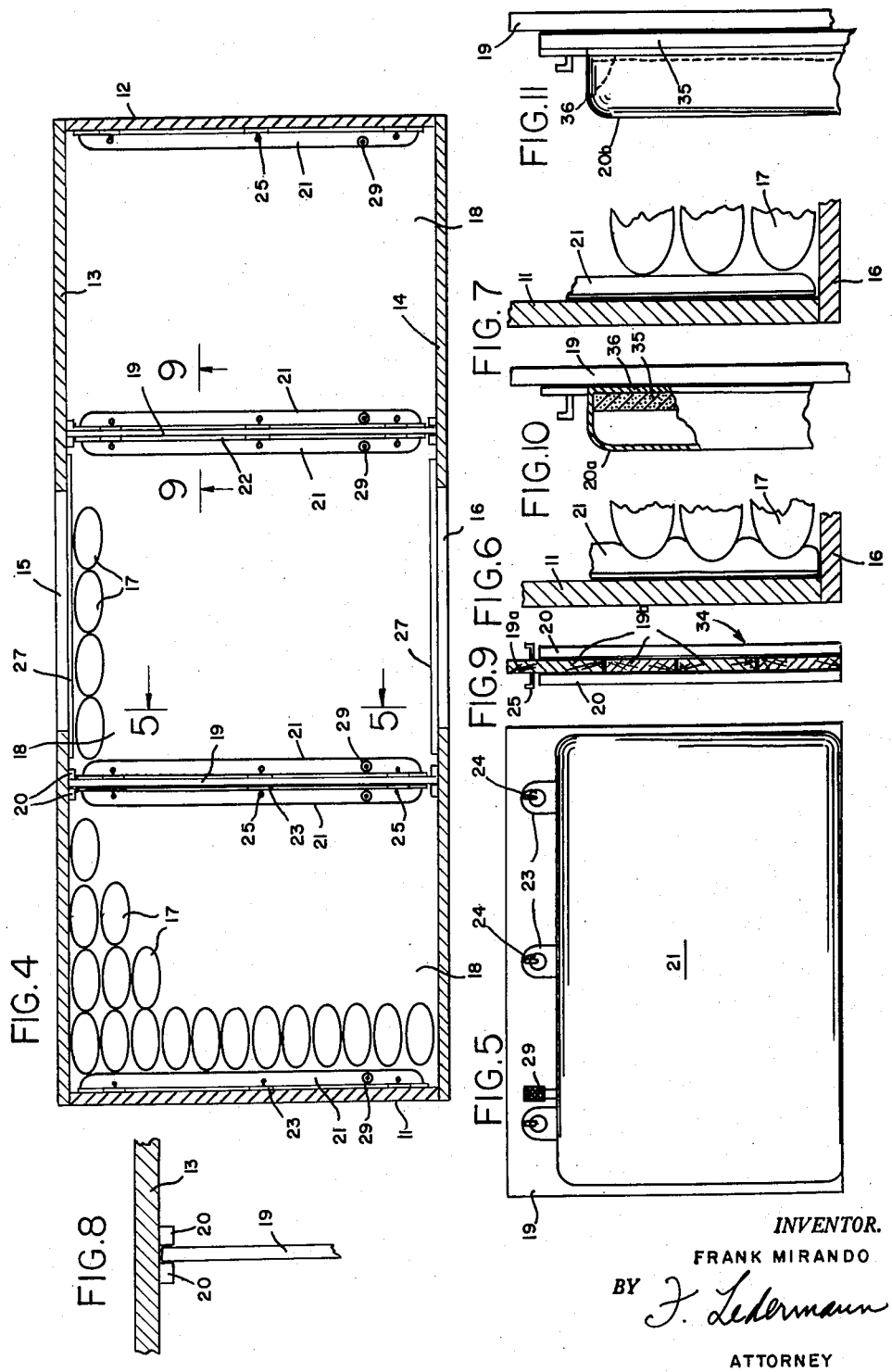
INVENTOR.
FRANK MIRANDO
BY *F. Ledermann*
ATTORNEY

United States Patent Office 3,115,977
Patented Dec. 31, 1963

3,115,977
METHOD OF SHIPPING WATERMELONS
Frank Mirando, 1657 Colden Ave., New York, N.Y.
Filed May 23, 1961, Ser. No. 112,102
1 Claim. (Cl. 214—152)

This invention relates to the stowing and shipping of watermelons in freight cars, trailer trucks and the like, and a primary object of the invention is the provision of certain new and useful improvements in the method of and means for such stowing and shipping whereby damage to the melons is reduced to a minimum.

A further object of the invention is the provision and arrangement of such means which involve a minimum of additional cost to the shipper and/or receiver of the melons, which additional cost is relatively small compared with the losses consequent to damage done to the melons in common methods of shipment. Damaged melons in a freight car lot run as high as sixty percent of the lot; in fact that damage rate is so high under ordinary conditions that railroads are not anxious for such business. Yet for the wholesaler who receives such shipments, transportation of freight cars is far more desirable than by trailer truck. For in the latter case the trucker is anxious to unload immediately upon arrival at his destination. As a result, when the wholesaler is not moving the melons out substantially as rapidly as they are being received, which may be a consequence of the weather at the time of delivery, or for other reasons, he is confronted with a storage problem. At the height of the watermelon season the wholesaler may require three or more freight car lots delivered daily, but when he cannot move them out as rapidly as they arrive he must have excess storage space available the provision of which is an uneconomical investment. In the case of deliveries in freight cars, all the wholesaler requires is a railroad siding more or less closely at hand. The railroads do not require immediate unloading of their freight cars; in fact, the cars need not be unloaded for a number of days without any charge to the receiver, and for additional days beyond the allowed number the charge per day is very small. Thus when receipts by the wholesaler exceed the rate at which he disposes of the melons, the loaded cars provide excess storage space either free of charge or at very small cost which requires no additional capital investment by the receiver.

A more particular object of the present invention is therefore the provision of means applicable to freight cars whereby watermelons may be shipped in them with practically no damage done to the melons in transit.

A further object of the invention is the provision of removable transverse partitions for a freight car, each partition having on each side thereof an inflatable cushion of non-rigid material such as, for example, rubber or other suitable elastic material, with means for inflating the cushions after the melons have been packed or stowed. The said partitions are spaced so as to divide the interior of the car into three or more, preferably three, sections of substantially equal length. The end walls of the car are also provided with such cushions, and panels are provided to close off the door spaces at the sides of the car to wall off the mid-section of the interior car compartment, in the case of shipment in box cars.

A further object of the invention is the provision of a method of packing or stowing the melons with their long axes positioned longitudinally of the car, whereby the air cushions, when inflated, serve to stabilize the load of melons and minimize shock to the melons, as will be hereinafter more clearly set forth.

It may here be remarked that the melons in a shipment suffer very little damage as a consequence of rubbing against their sides.

The above as well as additional objects will become apparent in the following description wherein reference numerals refer to like-numbered parts in the accompanying drawing. It is to be noted that the drawing is intended primarily for the purpose of illustration and is therefore neither intended nor desired to define the specific details or scope of the invention for the invention is best defined in the accompanying claims. Likewise, the following description, which refers to the invention as illustrated in the drawing, is not intended to serve as a limitation upon the invention except as such details may be set forth in the said claims.

Referring briefly to the drawing, FIG. 1 is a side elevational view of a freight car, with parts broken away and partly in section, illustrating an embodiment of the present invention.

FIG. 2 is a sectional view taken on the line 2—2 of FIG. 1.

FIG. 3 is an enlarged fragmentary side elevational view, partly in section and partly schematic, illustrating a means for simultaneously interconnecting all of the air cushions in a car for simultaneous inflation or deflation thereof.

FIG. 4 is a sectional view taken on the line 4—4 of FIG. 1, wherein the cushions are shown to be uninflated, or only partly inflated.

FIG. 5 is a view of one of the partitions with a cushion thereon as, for example, seen in looking in the direction of the arrows 5—5 of FIG. 4.

FIG. 6 is a view, partly in section, illustrating the interaction between an air cushion and the adjacent melons in a section, after the cushion has been inflated.

FIG. 7 is a view similar to FIG. 6 but showing the relative positions of the said melons and the cushion prior to inflation of the cushion.

FIG. 8 is an enlarged fragmentary sectional view taken on the line 8—8 of FIG. 2.

FIG. 9 is a sectional view taken on the line 9—9 of FIG. 1, with the cushions omitted and showing a modified partition structure.

FIGS. 10 and 11 show two modified cushion structures.

Referring now in detail to the drawing, the reference numeral 10 is shown to indicate a freight car of the closed or box type, having the end walls 11 and 12. In the case of open or hopper type of freight cars, not shown but to which the present invention is equally applicable, the height from floor to the top of the side walls is approximately one-half that of box cars. The side walls of the car shown are indicated by the numerals 13 and 14. The door spaces in the side walls are indicated at 15 and 16.

As shown in the drawing, a plurality of sections 18 are provided within the interior of the freight car, by means of partitions 19, which may be spaced equidistantly with respect to the opposed end walls of the car, or otherwise, and the watermelons 17 are stowed in these sections. By interposing the partitions the length of each compartment or section 18 is very substantially less than the length of the car, which is a desirable condition for the purpose of the present invention.

In actual use, the height of the stack of melons in each car rarely exceeds six layers, to avoid crushing of the melons in the bottom or lower layers by the weight of the layers above. In the case of the box car illustrated, the height of the partitions should not exceed one-half of the distance from floor to ceiling. In order that the partitions 19 may be readily removable as a unit, closely spaced vertical rails 20 are secured against the side walls of the car, the space between the rails providing guide slots or grooves in which the partitions are slidably mounted and from which they may be lifted clear of the rails and out of the way. The height of the rails is somewhat less than that of the partitions, as indicated in the drawings. FIG. 9 illustrates a modified form of partition at 19a, which is made up of a plurality of boards or panels 19b mounted one upon the other, for reasons which will become apparent below.

In the case of the present invention, the melons are positioned with their long axes longitudinal with respect to the car, i.e., with respect to the travel of the car, in the fashion illustrated in the drawings. The bottom layer of melons consists of a plurality of melons arranged in a series of parallel longitudinal lines, with the melons in one line having their sides in contact with those of the next adjacent line or lines, and with those in the two outer lines close to or in contact with the side walls of the car. The next layer of melons is so laid as also to provide longitudinal lines of melons, but in this layer each melon lies between two melons of the bottom layer. The bottom layer is indicated at 17a in FIGS. 1 and 2, and the next higher layer at 17b. The melons of the third layer are again set in the spaces between two melons of the layer 17b, and so on for the entire stack of melons in each section or compartment 18.

It is of course well known that watermelons, owing to their ovate shape, are far more resistant to pressure or impact directed against the ends thereof, that is, along their long axes, than to impact directed in any other direction, and that they are most susceptible to damage by impact directed radially or nearly radially in a plane at right angles to the long axis.

For the purpose of this invention and to minimize or eliminate possible damage to the melons in transit, an inflatable cushion of yieldable material, such as shown, for example, at 21, is provided for each side of each partition. These cushions may be provided with a backing 22 of fabric or other suitable relatively stiffer material, from the upper edge of which spaced tabs 23 extend having eyelets 24 formed therein engageable on hooks 25 near the top edge of the partition. Similar cushions 21 are also secured by hooks 25 to the end walls 11 and 12 of the car.

It is apparent that the units each of which comprises a partition 19 and two cushions 21, one on each side of the partition, may readily be mounted in place by sliding the partitions downward with the vertical edges of the partitions registering in the vertical grooves provided between the spaced guide rails 20; these grooves are indicated in FIG. 8. Conversely, the said units may readily be raised from between the rails when desired.

Before stowing melons into the various sections 18, the cushions may be entirely deflated or, probably preferably partly inflated. At the start of the stowing operation both partitions are removed, or, rather, have not been installed, and the two end sections 18 are first filled, that is, they are filled before the middle section 18. After several layers of melons have been stowed near the end wall of an end compartment plus one or two layers close to the rails 20 between which the adjacent partition is to be mounted, then the partition with its two deflated cushions is set in place, and the remainder of the section 18 at that end of the car is filled. Since as previously stated, not over six layers of melons are normally stacked, it is obvious that, in view of the maximum thickness of the melons the height of the stack is not excessive, so that a person may readily complete filling of a section in that portion thereof adjacent a partition by reaching over the latter. Of course any other method or sequence to stow the melons in a section 18 may be pursued.

After both end sections 18 have been filled, the midsection 18 is then filled. Assuming that the car is being entered through the door 15 shown at the top of FIG. 4, a panel 27, of which two are provided, having a width sufficiently wider than the width of the door space and a height substantially equal to that of the partitions 19, is placed against the inner wall 14 of the car to block the opposite door space 16, this panel or board resting upon the floor of the car. The midsection is also first stacked in layers built up on the floor and beginning at the board 27 blocking the space 16, and when the filling approaches completion the opposite board 27 is placed in position to block the door space 15. The car doors, which are normally slidably mounted on the outside of the side walls, are not shown in the drawing. Such doors are of course finally closed and locked, and when upon arrival of the car at its destination one or both car doors are opened, the boards 27 prevent the melons from rolling or falling out.

After all of the melons have been stowed in the various sections 18, the cushions 21 are inflated. It is to be noted that the height of each cushion, FIG. 1, exceeds the height of the stack of melons by a distance approximating the diameter, or width, of a melon. During inflation of the cushions, and owing to the flexibility of the material thereof, the wall of each cushion which faces the melons will form bulges or "blisters" between the ends of the adjacent melons of the column of melons nearest the cushion; such bulges are indicated at 28. Owing to the excess of height of the cushions over the height of the stack of melons, the entire uppermost portions of the cushions lying above the ends of the top layer will form a wide horizontal bulge 28a over the ends of that layer. Inflation of the cushions of course tends to push the melons together into a closely interengaged and stable mass, thus resisting movement between the melons upon impact such as resulting from sudden starting, stopping or bumping of the car. Thus the entire stack of melons in a section 18 is not only snugly packed and cushioned to absorb shocks which exert forces longitudinally of the car, but the overlapping bulges 28a tend to maintain the stack against vertical movement and the bulges 28 tend to maintain the layers and columns of melons in a stack from movement other than longitudinal. In other words, the means provided by the present invention tends to compress all of the melons in a section 18 into a single mass in which, while some movement occurs between melons upon impact of the car, all movements from that cause are simultaneously cushioned and are limited to a small amount of sliding of some melons upon others along their longitudinal axes.

It is common practice, in shipping watermelons, to line the floor and side walls with straw, the latter being done as the stack rises by stuffing straw between melons adjacent a side wall and the wall. This practice may also be used in the present case, but since it forms no part of the invention no straw has been shown in the drawing.

The inflating of the cushions 21 may be achieved in any desired manner. For example, the cushions on the end walls 11 and 12 may be fully inflated prior to mounting them. Each cushion has an air valve 29, and any air pump may be applied thereto to inflate the cushion. If a cushion on an end wall is inflated prior to filling the section with melons, when the opposite cushion on the partition 19 is inflated the results described above would be the same. Or a means such as shown in FIG. 3 may be employed to inflate or deflate all the cushions simultaneously. Here a hose 30, assumed to lead from a pump, not shown, has a valve 31 therein, and by means of a T coupling 32 this hose is connected to branch hoses 33 and 34 leading to the inlet valves 29 of the various cushions 21. The hose 30 may be in two parts 30a and 30b, with a standard hose coupling consisting of a threaded nipple 33 on the valve 31 and an internally threaded nut or sleeve 32 on the hose portion 30b. With this installation the hose portion 30a would be assumed to be positioned, when the car sections are filled with melons, within the middle section 18 with its coupling end 33 within reach of a person who opens the freight car door upon delivery of the load, or at the time the delivered load is to be removed from the car. Conversely, after a car has been loaded with melons for shipment to its destination, the hose portion 30b which is assumed to be attached to an air pump discharge is coupled to the valve portion 33 to inflate the cushions. A low power portable gasoline or electric pump with a hose 30b attached thereto is all that would be required at the point of origin of the shipment, while at the point of destination no extra equipment need be provided as all that is required is that the valve 31 be opened to deflate the cushions.

The modified form of partition shown at 34 in FIG. 9 may be advantageous to use in some cases instead of that shown at 19 and previously described. Here the complete partition 19a is formed of a number (four being shown) of horizontal panels 19b of reduced height, having their ends registering between the rails 20. As either end section 21, FIGS. 1 and 4, is being stacked with melons, the partition defining the section may be built up in stages as the pile of melons rises. For example, after the pile adjacent the place for the partition has risen sufficiently, first the lowermost panel 19b may be set in place, then the one above that, and so on until the top panel has been mounted in place. The men stacking the melons will have left a small but sufficient space between the ends of the adjacent melons and the partition 34 so that, when the building up of the partition has been completed the cushion 21 on the side of the partition adjacent the melons, which will be in deflated condition, may be slipped down between the melons and the partition and hooked on the hooks 25 extending from the uppermost panel 19b. After an end section 18 has been filled with melons, the cushion 21 on the opposite side of the built up partition is then also suspended from the hooks 25 on that side, so that when both end partitions have been built up and hung with the cushions, the middle section 18 is ready to be filled.

Whatever equipment is needed or used to carry out the present invention as herein disclosed, involves a small original investment but of course it can be used over and over again. When considering the economic waste which results from present methods of shipping watermelons, to the shipper, the railroads and truckers, as well as to the recipient, the added cost of the above equipment is small and well worth while.

As previously mentioned, the present invention is applicable to trailer trucks as well as railroad freight cars, but because of the disadvantages stated, which are present when shipments are made in trailer trucks, the application of the invention to freight cars has been emphasized rather than to trucks.

An alternative way of stacking the melons in the various compartments 18, is simply to stack the whole mass completely with the adjacent partition removed, leaving a small but sufficient space between the ends of the melons at the end of the mass where the partition is to be mounted, so that the partition with the cushion on the inside of the section may be set in place.

It is to be noted that the invention is also applicable in the case of a vehicle having but a single compartment such as any of the three sections 18 shown, wherein the longitudinally opposed walls define the compartment.

FIGS. 10 and 11 show two modified cushion structures at 21a and 21b, respectively. Cushion 21a is shown provided with a pad of foam or sponge rubber 35 mounted against the back wall 36 of the cushion, within the cushion. In the case of the cushion 21b, instead of having the foam or sponge rubber pad 35 mounted inside the cushion, the pad is mounted against the outside of the back wall 36 of the cushion. The pads 35 may be secured to the back walls of the cushions 21a and 21b in any desired manner, to substantially or completely cover them; in both cases the pads may be secured to the walls 36 by means of cement, not shown.

The modified cushions of FIGS. 10 and 11 are particularly beneficial in reducing shock damage to those melons which are in contact with the cushions, under certain conditions. Ordinarily shock forces resulting from jolting of a freight car or truck are directed more or less in a direction longitudinal to the direction of travel of the vehicle. Sometimes, however, such forces are directed at a sufficiently large angle to the direction of travel to loosen one, two or more of the total number of melons which are in contact with the cushion and to urge them more forcefully into the cushion. Such loosened melons may thus be urged into the cushion a sufficient distance to strike the back wall of the cushion (which is stopped by a partition or by an end wall of the vehicle) with a force sufficient to damage them. With the provision of a pad 35 in accordance with FIG. 10 or FIG. 11, however, such force is absorbed and the melons are prevented from colliding with a too-hard surface. In practice, the pads 35 have a thickness preferably between two and three inches.

While the invention has been described with particular reference to the embodiments illustrated in the accompanying drawing, such is not to be construed as a limitation upon the invention which is best defined in the appended claims.

The invention having thus been described, what is claimed and desired to be secured by Letters Patent is as follows:

The method of loading watermelons in a freight carrying compartment consisting in mounting on both ends of the compartment an at least partly deflated inflatable elastic cushion having a height greater than the height of the stack of melons to be loaded, stacking the melons in layers in the compartment with the long axes of the melons extending longitudinal to the compartment, and inflating the cushions to a degree sufficient to urge the melons into a compact mass and to bulge portions of the cushions into the space between the ends of the melons which are adjacent the cushions and to bulge the portions of the cushions which extend above the stack over the ends of the top layer of melons.

References Cited in the file of this patent
UNITED STATES PATENTS

| | | |
|---|---|---|
| 2,112,486 | Francis | Mar. 29, 1938 |
| 2,856,867 | Dasey | Oct. 21, 1958 |
| 2,942,560 | Shultz | June 28, 1960 |
| 2,976,823 | Dodge | Mar. 28, 1961 |